(12) United States Patent
Sevom et al.

(10) Patent No.: US 11,750,943 B2
(45) Date of Patent: Sep. 5, 2023

(54) METHOD AND DEVICE FOR CORRECTING VARYING LATERAL CHROMATIC ABERRATION, STORAGE MEDIUM, AND COMPUTER EQUIPMENT

(71) Applicant: AAC Optics Solutions Pte. Ltd., Singapore (SG)

(72) Inventors: Vida Fakour Sevom, Tampere (FI); Dmytro Paliy, Tampere (FI); Juuso Gren, Tampere (FI)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 17/505,661

(22) Filed: Oct. 20, 2021

(65) Prior Publication Data

US 2023/0118394 A1   Apr. 20, 2023

(51) Int. Cl.
| | | |
|---|---|---|
| *H04N 25/611* | (2023.01) | |
| *G06T 7/80* | (2017.01) | |
| *H04N 25/61* | (2023.01) | |
| *G02B 27/00* | (2006.01) | |
| *G06T 5/00* | (2006.01) | |

(52) U.S. Cl.
CPC ......... *H04N 25/611* (2023.01); *G02B 27/005* (2013.01); *G06T 5/006* (2013.01); *G06T 7/80* (2017.01); *H04N 25/61* (2023.01); *G06T 2207/10024* (2013.01)

(58) Field of Classification Search
None
See application file for complete search history.

(56) References Cited

U.S. PATENT DOCUMENTS

| | | | | |
|---|---|---|---|---|
| 2003/0185434 | A1* | 10/2003 | Lee | ......................... G06F 3/012 382/154 |
| 2004/0150732 | A1* | 8/2004 | Yamanaka | ........... H04N 25/134 348/E9.01 |
| 2012/0081583 | A1* | 4/2012 | Kikuchi | ............. H04N 9/04517 348/242 |

* cited by examiner

*Primary Examiner* — Quan Pham
(74) *Attorney, Agent, or Firm* — W&G Law Group

(57) ABSTRACT

Provided is a method and a device for correcting lateral chromatic aberration, a storage medium and a computer equipment. In the method, a relationship model between lens position and magnitude of LCA is constructed based on preset parameters of lens positions, and the relationship model is stored as calibration data; system parameters of a camera to be corrected and pre-stored calibration data are obtained; the LCA of the camera to be corrected is obtained by calculating the system parameters; and the LCA is corrected by the calibration data. With the method, the LCA of the lens can be removed when the focus distance is changed, and the method is suitable for mass-production.

9 Claims, 17 Drawing Sheets

METHOD AND DEVICE FOR CORRECTING VARYING LATERAL CHROMATIC ABERRATION, STORAGE MEDIUM, AND COMPUTER EQUIPMENT

TECHNICAL FIELD

The present invention relates to the field of digital image processing, and in particular, to a method and a device for correcting varying lateral chromatic aberration, a storage medium, and a computer equipment.

BACKGROUND

In an ideal lens, all wavelengths have a same single focal point, but such an ideal lens does not exist in practice. A refractive index of any medium except for the vacuum varies with the wavelength. When visible light passes through a camera lens, light having a greater wavelength has a smaller refractive index. For most lenses, blue light has the greatest refractive index, followed by green light and red light. Light of different wavelengths focuses at different positions, resulting in displacement of focal points of the blue light, green light and red light, which may be categorized into two types, i.e., displacement in a direction parallel to a focal plane and displacement in a direction perpendicular to the focal plane. Chromatic aberration caused by the displacement in the direction parallel to the focal plane is referred to as lateral chromatic aberration (LCA), which is the most common and visually obvious, and the influence caused by the lateral chromatic aberration is growing with the continuous increase of resolution of an image sensor and the continuous decrease of the size of the pixel, and thus becomes a problem that needs to be solved in, for example, a motion camera, a security surveillance camera and a camera of an automobile data recorder.

For an auto-focus camera, the lens moves in the camera module to change the focus from a target object. The LCA changes with the change of the position of the lens, that is, the LCA changes dynamically when the camera focuses at different distances.

At present, it is very difficult and expensive to correct the LCA of the auto-focus camera in terms of hardware.

SUMMARY

In view of the above, the embodiments of the present invention provide a method and a device for correcting varying lateral chromatic aberration, a storage medium, and a computer equipment. By the present invention, the lateral chromatic aberration of the camera lens can be corrected in terms of hardware with saved costs.

In a first aspect, an embodiment of the present invention provides a method for correcting LCA, including: constructing a relationship model between lens position and magnitude of lateral chromatic aberration based on preset parameters of lens positions, and storing the relationship model as calibration data; acquiring system parameters of a camera to be corrected and pre-stored calibration data; obtaining the lateral chromatic aberration of the camera to be corrected by calculating the system parameters; and correcting the lateral chromatic aberration by the calibration data.

As an improvement, the method for correcting lateral chromatic aberration further includes prior to acquiring the system parameters of the camera to be corrected and the pre-stored calibration data: capturing a target image from a test chart-diagram; calculating magnitude of lateral chromatic aberration of a camera module based on the target image; and storing the relationship model between lens position and magnitude of lateral chromatic aberration as calibration data.

As an improvement, said storing the relationship model between lens position and magnitude of lateral chromatic aberration as calibration data includes: storing the relationship model between lens position and magnitude of lateral chromatic aberration as calibration data into a memory of the camera to be corrected.

As an improvement, the calibration data includes data in a format of a grid, a parametric model, or a symmetric model.

As an improvement, said calculating magnitude of lateral chromatic aberration of the camera module based on the target image includes: amplifying the target image to obtain an amplified target image; detecting target graphics and calculating mass centers of the target graphics based on the amplified target image; compensating for shift of the mass centers by sampling shift compensation; removing target graphics with wrong parameters by an outlier removal algorithm; extrapolating the mass centers of the target graphics at borders of the amplified target image; and converting scattered data into a 2D regular grid, so as to obtain magnitude of lateral chromatic aberration.

In a second aspect, an embodiment of the present invention provides a device for correcting lateral chromatic aberration, including: a capturing module configured to capture a target image from a test chart-diagram; a first calculation module configured to calculate magnitude of lateral chromatic aberration of a camera module based on the target image, and to construct a relationship model between lens position and magnitude of lateral chromatic aberration based on preset parameters of lens positions; and a storage module configured to store the relationship model between lens position and magnitude of lateral chromatic aberration as the calibration data.

As an improvement, the storage module is further configured to store the relationship model between lens position and magnitude of lateral chromatic aberration into a memory of the camera to be corrected.

As an improvement, the calibration data includes data in a format of a grid, a parametric model, or a symmetric model.

As an improvement, the first calculation module includes: an amplifying sub-module configured to amplify the target image to obtain an amplified target image; a calculation sub-module configured to detect target graphics and calculate mass centers of the target graphics based on the amplified target image; a compensation sub-module configured to compensate for shift of the mass centers by sampling shift compensation; a removal sub-module configured to remove the target graphics with wrong parameters by an outlier removal algorithm; an extrapolation sub-module configured to extrapolate the mass centers of the target graphics at borders of the amplified target image; a conversion sub-module configured to convert scattered data into a 2D regular grid, so as to obtain magnitude of lateral chromatic aberration; and a relationship model sub-module configured to construct the relationship model between lens position and magnitude of lateral chromatic aberration.

As an improvement, the device for correcting lateral chromatic aberration includes: an acquisition module configured to acquire system parameters of a camera to be corrected and pre-stored calibration data; a second calculation module configured to obtain the lateral chromatic aberration of the camera to be corrected by the system parameters; and a correction module configured to correct the lateral chromatic aberration by the calibration data In a third aspect, an embodiment of the present invention provides a computer equipment including a memory configured to store information including program instructions and a processor configured to control execution of the program instructions, wherein the program instructions, when loaded and executed by the processor, perform the steps in the method for correcting LCA as described above.

In the technical solutions of the method and the device for correcting the LCA, the storage medium, and the computer equipment provided by the embodiments of the present invention, the relationship model between lens position and the magnitude of LCA based on preset parameters of lens positions, the relationship model is stored as calibration data; system parameters of the camera to be corrected and pre-stored calibration data are acquired; the LCA of the camera to be corrected are obtained by calculating the system parameters; and the LCA by the calibration data are corrected. In embodiments of the present invention, the LCA of the lens can be removed when the focus distance is changed, and the embodiments of the present invention are suitable for mass-production.

DESCRIPTION OF EMBODIMENTS

Figure 1:
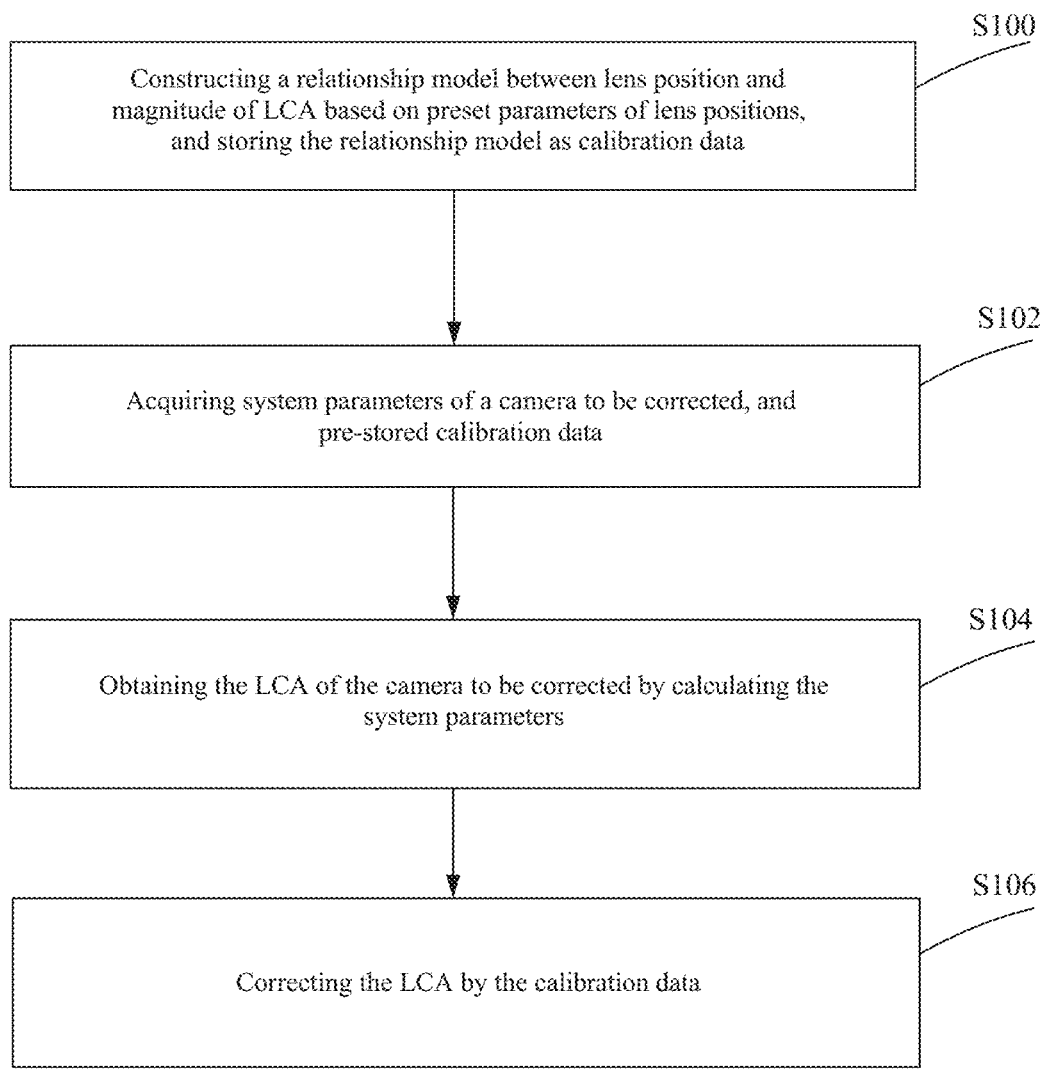
FIG. 1 is a flow chart of a method for correcting LCA according to an embodiment of the present invention.

The embodiments of the present invention will be described in detail below, and are illustrated in the drawings, in which the same or similar numeral always indicates the same or similar element or an element with the same or similar function. The embodiments as described below with reference to the drawings are illustrative, and are merely intended to illustrate the present invention and shall not be considered as a limitation to the present invention.

FIG. 1 is a flow chart of a method for correcting the LCA according to an embodiment of the present invention. As shown in FIG. 1, the method includes steps of:

S100, constructing a relationship model between lens position and magnitude of LCA based on preset parameters of lens positions, and storing the relationship model as calibration data;

S102, acquiring system parameters of a camera to be corrected, and pre-stored calibration data;

S104, obtaining the LCA of the camera to be corrected by calculating the system parameters; and S106, correcting the LCA by the calibration data.

In the technical solution of the method for correcting the LCA according to this embodiment of the present invention, a relationship model between lens position and magnitude of LCA is constructed based on preset parameters of lens positions, and is stored as calibration data; the system parameters of a camera to be corrected and the pre-stored calibration data are acquired; the LCA of the camera to be corrected is obtained by calculating the system parameters; and the LCA is corrected by the calibration data. This embodiment of the present invention can remove the LCA of the lens when changing a focus distance and is suitable for mass-production.

Figure 2:
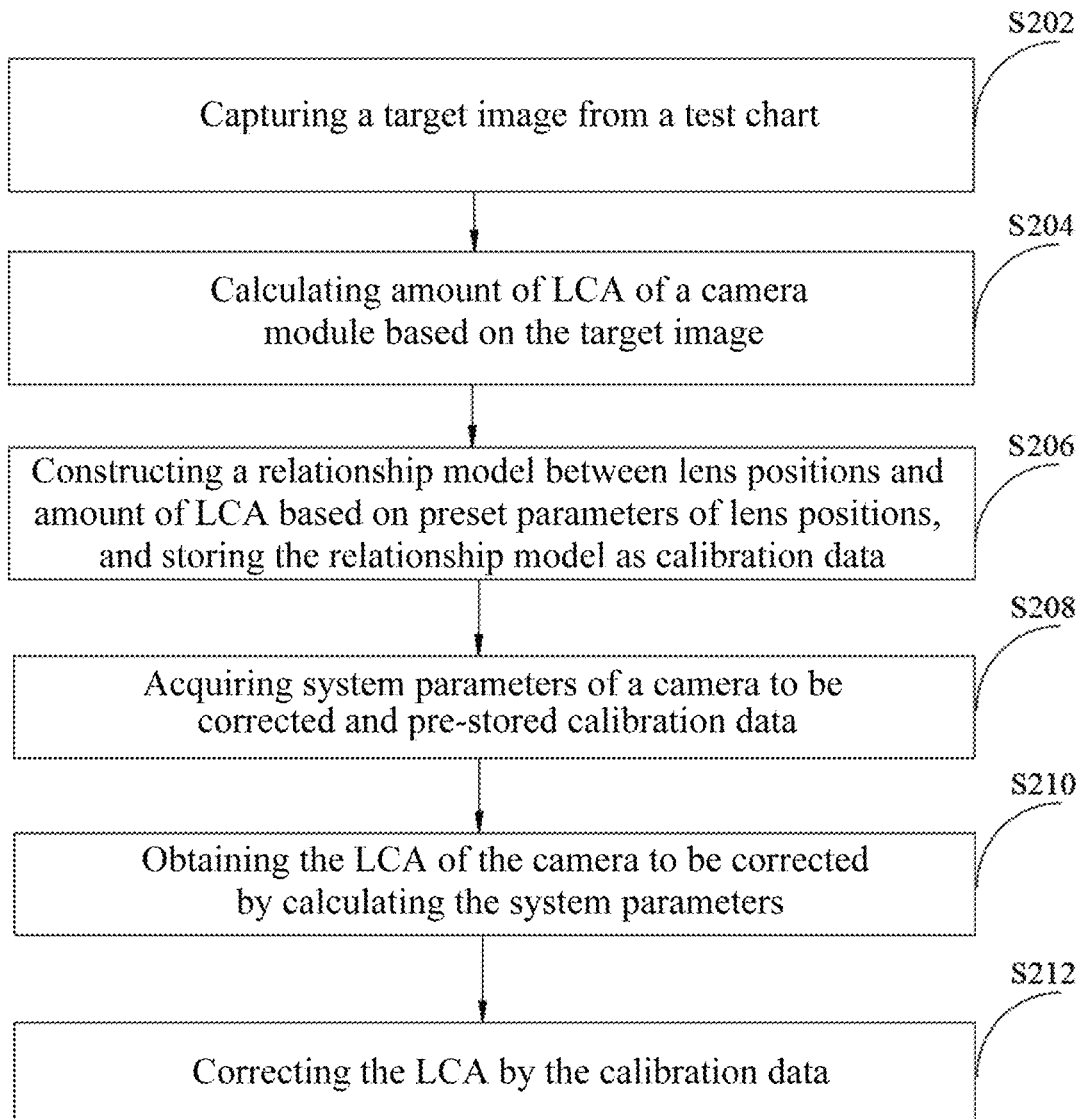
FIG. 2 is a flow chart of a method for correcting LCA according to another embodiment of the present invention.

FIG. 2 is a flow chart of a method for correcting LCA according to another embodiment of the present invention. As shown in FIG. 2, the method includes a step of:

S202, capturing a target image from a test chart-diagram.

In an embodiment of the present invention, each step can be performed by the device for correcting the LCA.

Figure 4:
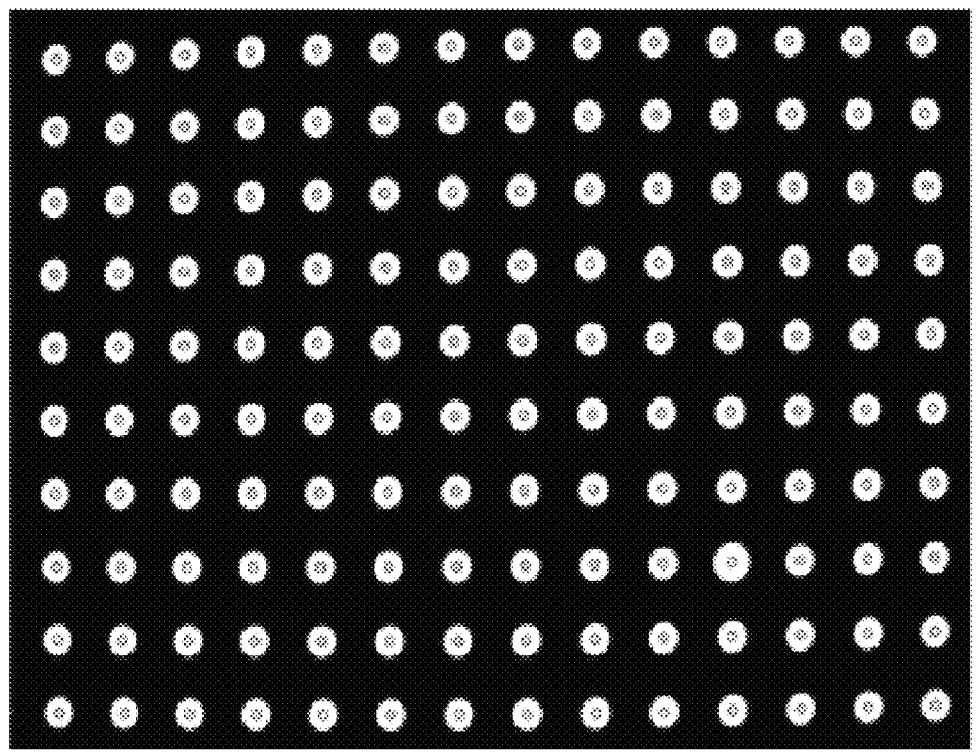
FIG. 4 is a test chart-diagram according to an embodiment of the present invention.
Figure 5:
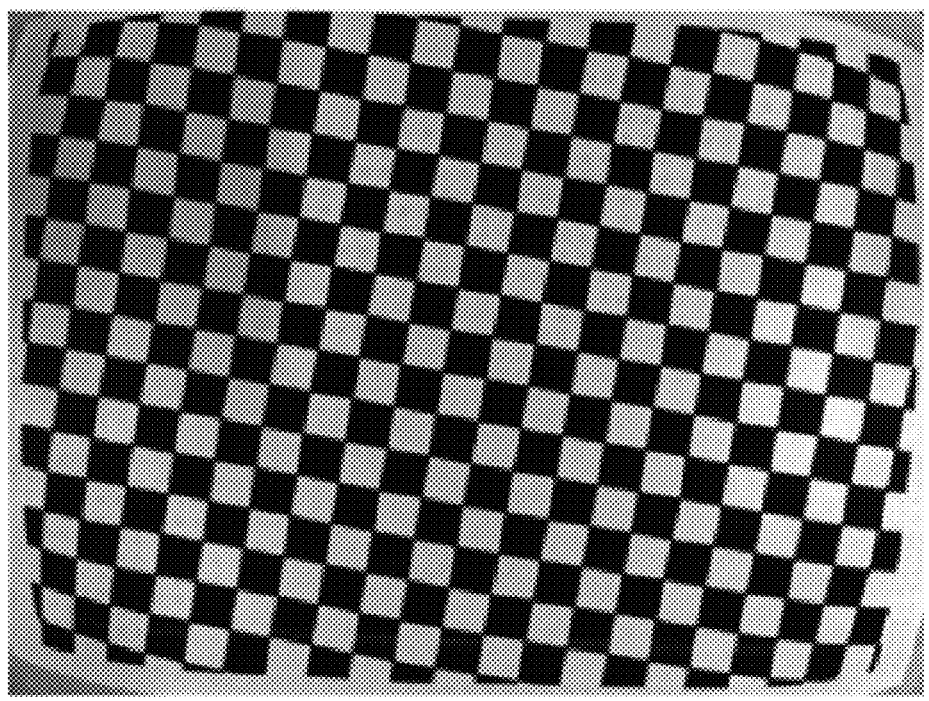
FIG. 5 is another test chart-diagram according to an embodiment of the present invention.

In S202, the test chart-diagram may be a chart-diagram with dots (as shown in FIG. 4), a chart-diagram with crosses, a test chart-diagram with corners of squares (as shown in FIG. 5), etc. The present invention does not limit the form of the test chart-diagram. For the sake of not loss of generality, this embodiment of the invention focuses on the test chart-diagram with dots. The purpose of using the test chart-diagram in this embodiment of the present invention is to define visible positions of each color component of the same structure on an imaging sensor.

The method further includes a step of:

S204: calculating magnitude of LCA of a camera module based on the target image.

In an embodiment of the present invention, with reference to FIG. 3, S204 includes steps of S204a, S204b, S204c, S204d, S204e, and S204f that will be described below.

S204a: amplifying the target image to obtain an amplified target image.

In S204a, the target image is amplified to improve accuracy and robustness for calculating a mass center of the amplified target image.

As can be seen from the above, since the test chart-diagram may include the chart-diagram with dots, the chart-diagram with crosses or the chart-diagram with corners of squares, target graphics in the test image may be dots, crosses, or corners of squares, but are not limited to these forms.

In an embodiment of the present invention, some pre-processing operations such as defect pixel correction, noise filtering, and lens shading correction are needed to be performed prior to the step of S204.

S204b: detecting target graphics and calculating mass centers of the target graphics based on the amplified target image.

Before the step 204b, in an embodiment of the present invention, a grayscale image is first converted into a binary image, so as to separate the target graphics from background.

In an example, the mass centers of the target graphics may be found by means of existing Matlab command "region-props". The mass centers of the target graphics may be directly calculated by definitions thereof, which is already implemented within the Matlab toolbox.

The method for correcting the LCA according to an embodiment of the present invention works with any sizes of the target graphics in the test chart-diagram. After the target image is captured, locations of target graphics or other details in the target image are automatically detected. The mass centers are points associated with the detected target graphics, and are calculated in each color channel with sub-pixel accuracy. The detection process of the target graphics is performed in data collected by a raw Bayer pattern imaging sensor. It is worth to emphasize that the method for correcting LCA according to this embodiment of the present invention may be applied to single-color value per location bayer data, or three-color value RGB data per location.

S204c: compensating for shift of the mass centers by Bayer shift compensation.

In an embodiment of the present invention, the shift of mass centers of the target graphics are compensated by Bayer shift compensation, and color-filtered pixels are located.

It should be noted that, since the target image is collected by the Bayer imaging sensor, shifts between color channels must be considered. Therefore, the calculated mass centers in each individual color channel are compensated based on the shifts between the color channels.

S204d: removing the target graphics with wrong parameters by an outlier removal algorithm.

In an embodiment of the present invention, outliers are detected by checking shape parameters of the target graphics. If the detected target graphics have wrong parameters, the target graphics with the wrong parameters are deleted.

S204e: extrapolating the mass centers of the target graphics at borders of the amplified target image.

In an embodiment of the present invention, on the one hand, there is no typical measurement data at borders and corners of the amplified target image; and on the other hand, LCA phenomenon is usually most severe near the borders of the image. An embodiment of the present invention provides build parametric approximation model by exploiting measured data and extrapolate distortion at borders and corners of the image. This allows for creating regularly sampled 2D array of distortion for the whole image more accurately.

S204f: obtaining magnitude of LCA by converting scattered data into a 2D regular grid.

In an embodiment of the present invention, the locations of detected dots are represented as regularly sampled 2D array data by interpolating given random globally located dots in an input image.

Figure 8:
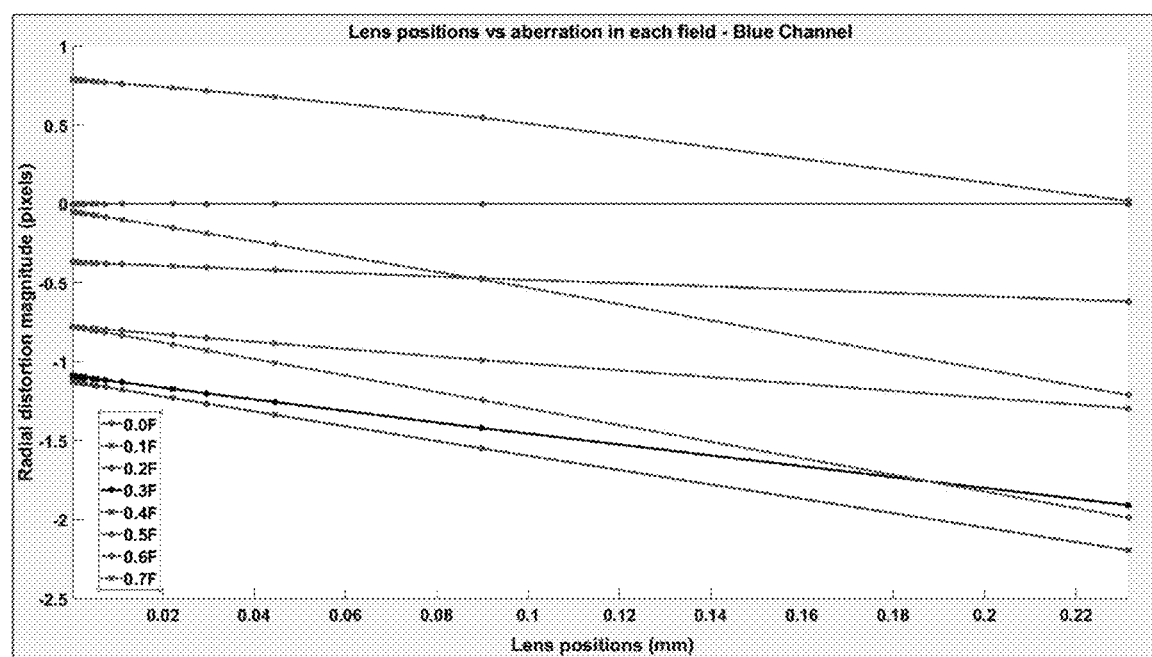
FIG. 8 is a schematic model diagram of a relationship between lens position and magnitude of LCA in a blue channel according to an embodiment of the present invention.
Figure 9:
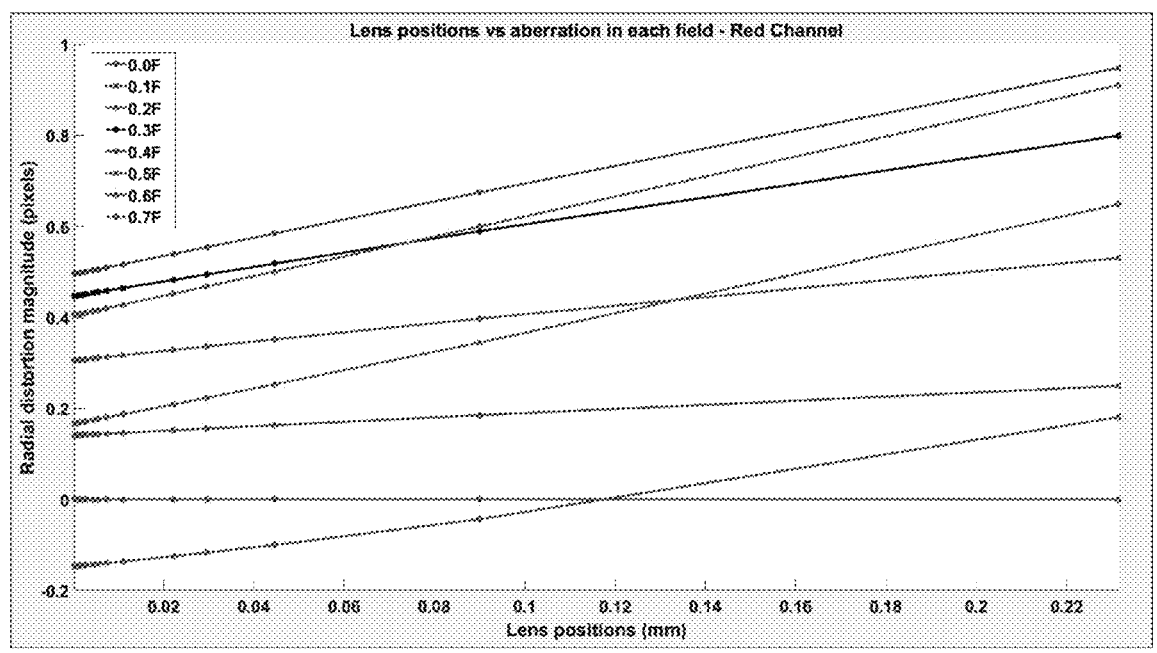
FIG. 9 is a schematic model diagram of a relationship between lens position and magnitude of LCA in a red channel according to an embodiment of the present invention.

S206: constructing a relationship model between lens position and magnitude of LCA based on preset parameters of lens positions, and storing the relationship model as calibration data, as shown in FIGS. 8-9.

In this embodiment of the present invention, the S206 includes storing the relationship model between lens position and magnitude of LCA as calibration data into a storage of the camera to be corrected.

Figure 10:
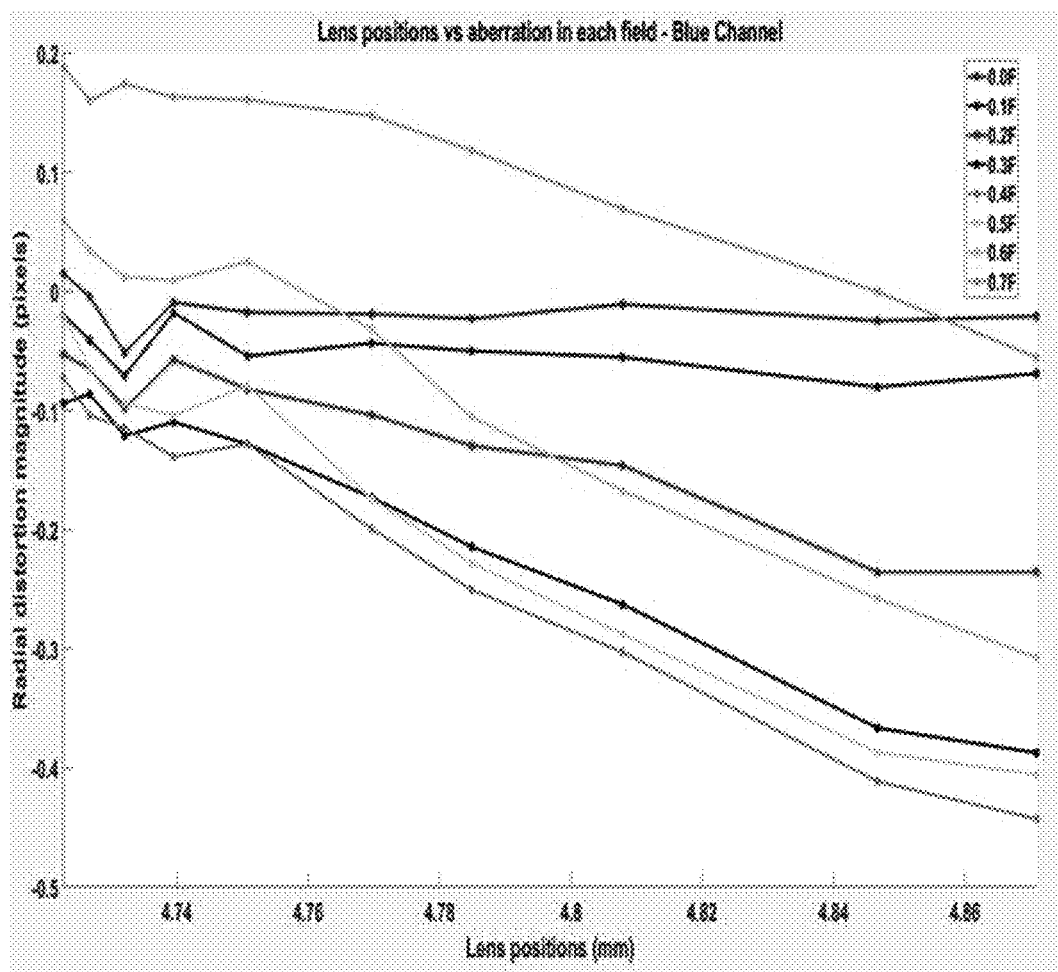
FIG. 10 illustrates measured distortion along lens positions in different field height values for a blue channel.
Figure 11:
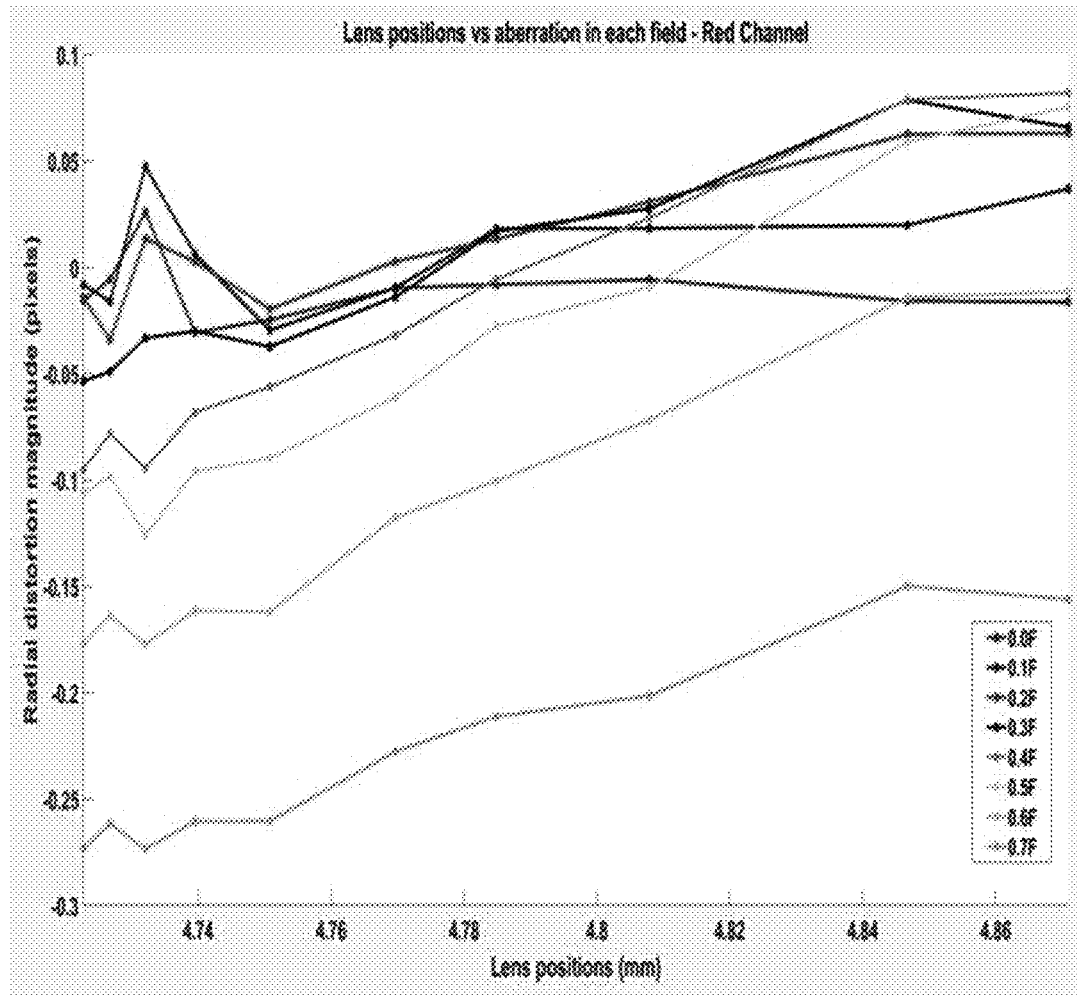
FIG. 11 illustrates measured distortion along lens positions in different field height values for a red channel.

FIG. 10 and FIG. 11 illustrate measured distortion along lens positions in different field height values for a blue channel and a red channel, respectively. Here, FIG. 10 and FIG. 11 illustrate measurements from real data shown in the figures.

Figure 12:
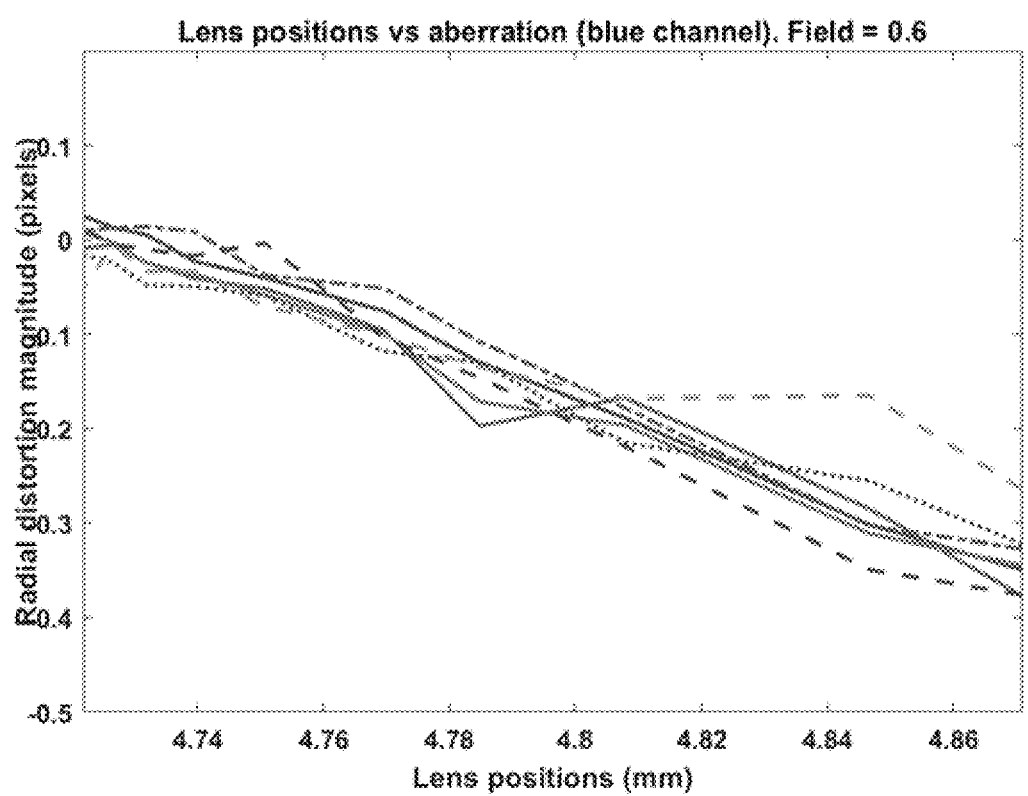
FIG. 12 is a schematic model diagram of a relationship between lens position and magnitude of LCA in a blue channel for a fixed field height value (0.6) measured from a set of samples according to an embodiment of the present invention.
Figure 13:
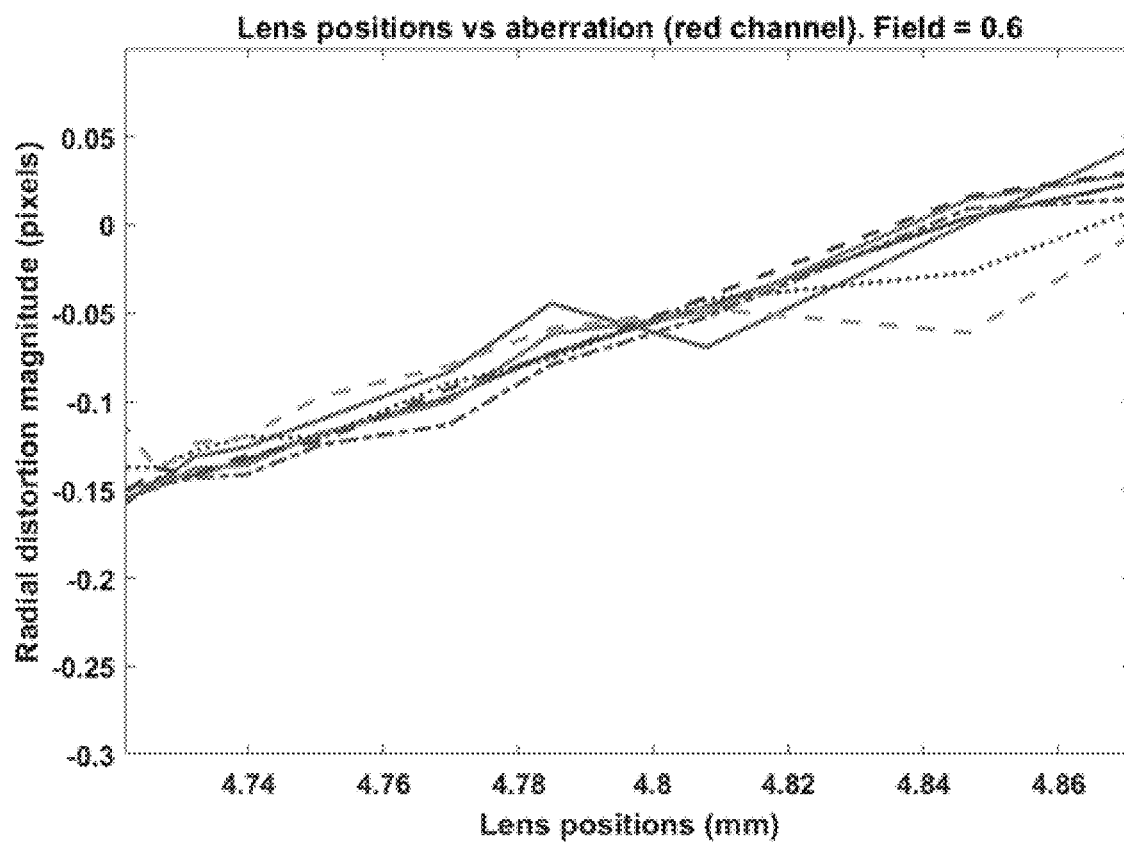
FIG. 13 is a schematic model diagram of a relationship between lens position and magnitude of LCA in a red channel for a fixed field height value (0.6) measured from set of samples according to an embodiment of the present invention.

In an example, FIG. 12 is a schematic model diagram of a relationship between lens position and magnitude of LCA in a blue channel for a fixed field height value (0.6) measured from a set of samples according to an embodiment of the present invention; and FIG. 13 is a schematic model diagram of a relationship between lens position and magnitude of LCA in a red channel for a fixed field height value (0.6) measured from a set of samples according to an embodiment of the present invention.

The figure illustrates how measured LCA from real data varies between 7 camera modules as a function of lens position. This illustration supports the proposed model, and estimated parameters for it, is valid and applicable across different camera module samples of the same camera module design.

In this step, the data of 2D arrays of vectors can be filtered with conventional convolution filters and efficiently written to the storage of the camera to be corrected. Herein, it is enough to store vectors only, without needing to store coordinates of points for which these vectors are calculated.

The method for correcting LCA in the related art is to convert the detected dots in Cartesian coordinates to polar coordinate system, in which the optical center of lens is regarding as the center, and LCA is the difference of red and green radius and blue and green radius. In this method, having LCA in different radius makes it possible to generate a parametric model (e.g. n-degree polynomial). Therefore, the parametric model in this method requires quite little memory. However, this method relies on radially symmetric LCA, which exists only in an ideal optics design, and it is very difficult to obtain radially symmetric LCA in mass-produced lenses manufacturing, due to non-idealities in terms of lens barrel alignment and materials.

Figure 6:
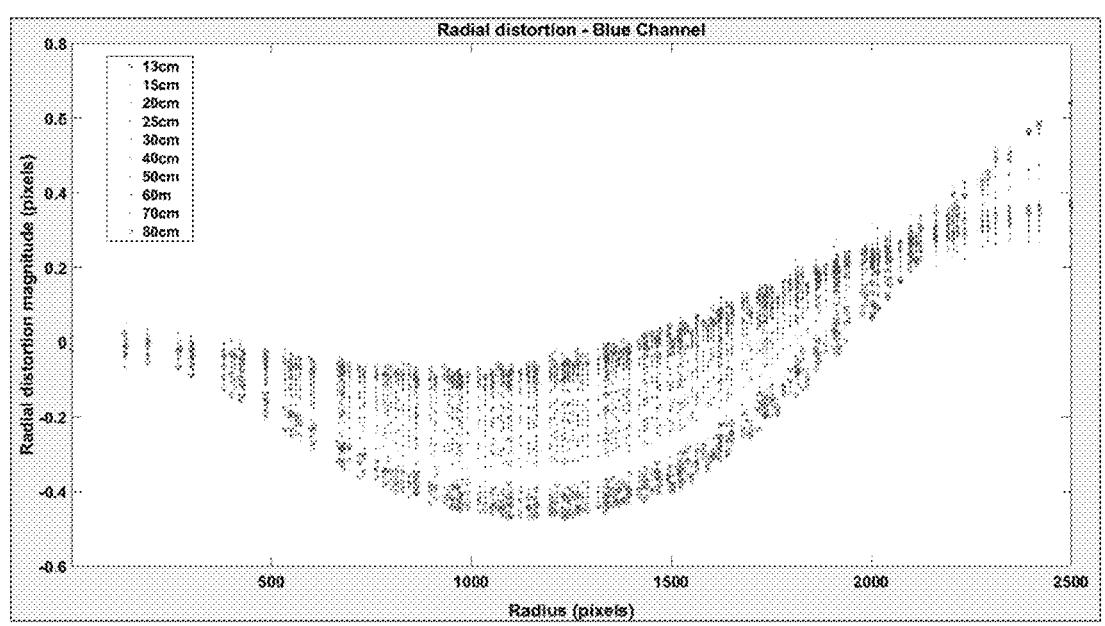
FIG. 6 is a measurement diagram of radial LCA in a blue channel according to an embodiment of the present invention.
Figure 7:
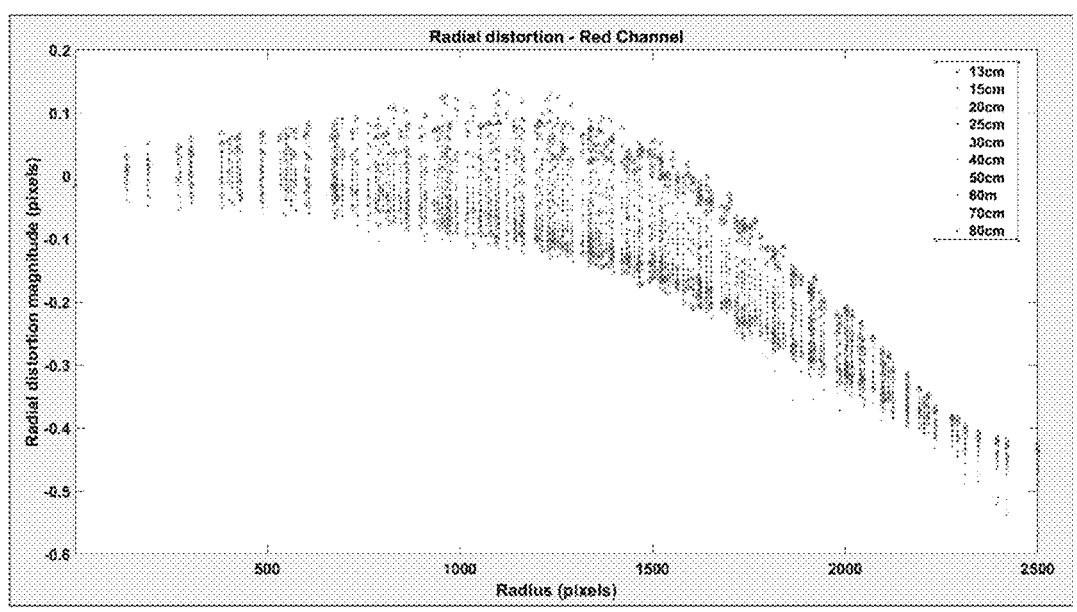
FIG. 7 is a measurement diagram of radial LCA in a red channel according to an embodiment of the present invention.

One of benefits of the method according to the present invention is the possibility to compensate misalignment of lenses within the assembled lens barrel. Moreover, degree of polynomial function might vary a lot according to different modules. As shown in FIGS. 6-7, for a fixed field radius, LCA values vary not only in vector's magnitude in radial direction towards optical sensor center, but also in spatial direction. This indicates the fact that LCA is not completely radially symmetric in the optics, and an ideal assembly process should be a single line.

In view of above, an embodiment of the present invention provides a calibration method for non-symmetric non-parametric LCA. Assumption of LCA being radially symmetric is valid only in optics design and modeling, while in mass production, such model is only approximation due to errors in lens barrel assembly and materials. If manufacturing process is ideal, then all measured data (scattering points) shown in FIG. 6 would lie on respective lines, and the lines would be totally identical to the modeled optical distortion, provided that the measurement errors are zero. Thus, in this embodiment of the present invention, errors and deficiencies in assembly and materials can be compensated.

In the present invention, it is not necessary to add any hardware structure to the camera to be calibrated, and only the original memory inside the camera to be calibrated is used.

In the present invention, the calibration data includes data in the format of a grid, a parametric model, or a symmetric model. Therefore, the method for correcting the LCA according to the present invention works with calibration data in different formats, thereby improving the usage flexibility. The calibration data in the grid format is the most accurate, but occupies the most memory. If memory consumption has to be decreased, the memory may be compressed in the present invention by changing format, size of the grid/model, data precision of the calibration data, etc.

In the present invention, the relationship model between lens position and magnitude of LCA of the lens of the camera to be calibrated may be calibrated in advance to obtain the calibration data, and the calibration data may then be stored into the memory of the camera to be corrected. This method is fast and simple, and is suitable for mass production line, thus every camera to be calibrated may be calibrated individually.

The method further includes the steps of:

S208: acquiring system parameters of a camera to be corrected and pre-stored calibration data;

S210: obtaining the LCA of the camera to be corrected by calculating the system parameters; and S212: correcting the LCA by the calibration data.

In the present invention, the LCA calibration is a procedure to measure spatial distance between red and blue points in a green spectral of the same point by using the imaging sensor. Such a distance in ideal aberration-free optical system shall be zero, while the distance in practice is not zero. The purpose of the present invention is to correct this distance to make it become zero.

Figure 14:
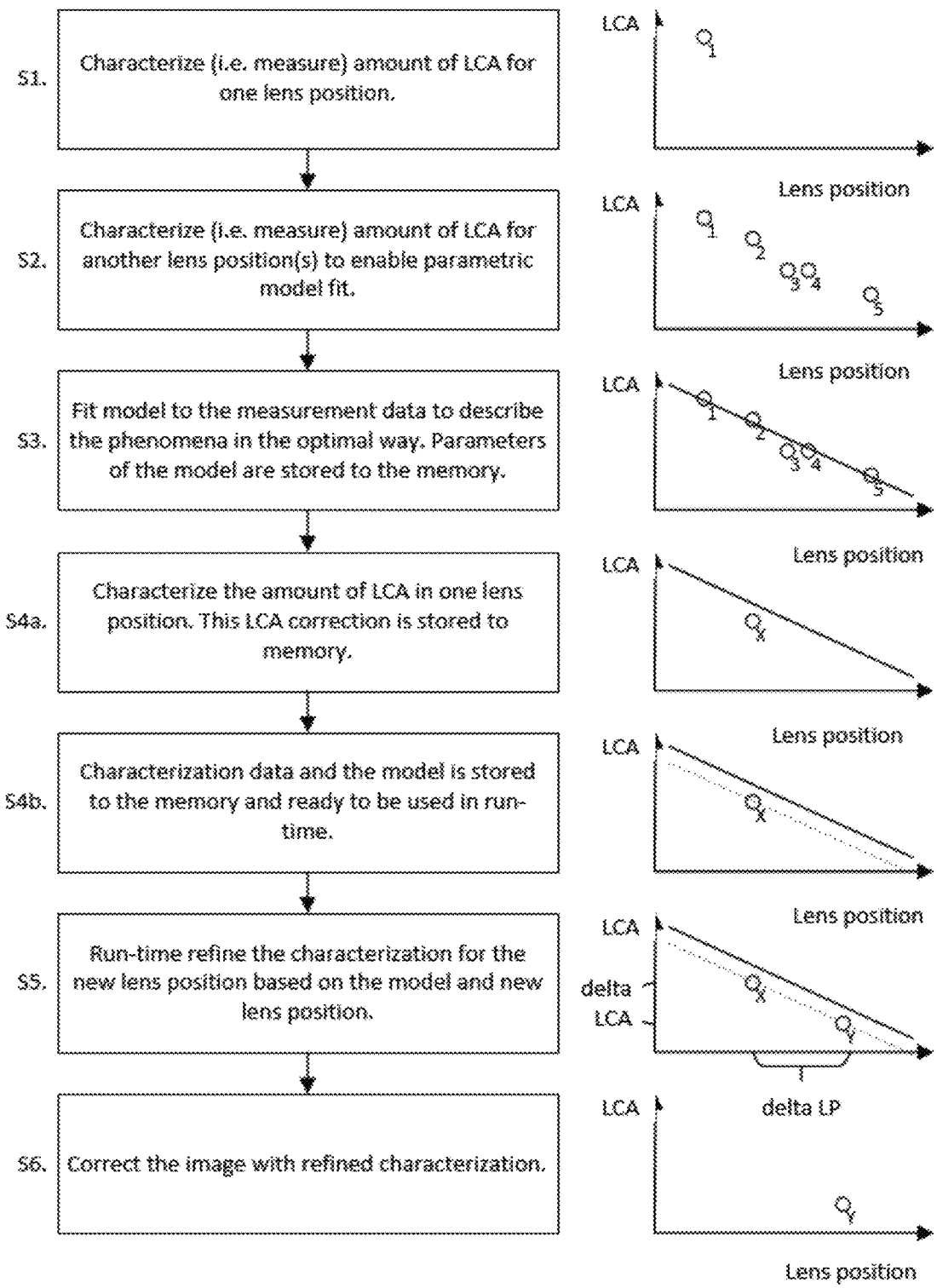
FIG. 14 is a block diagram of measuring LCA per given field height, fitting parametric model, and using the model and one stored correction to calculate any new correction for any lens position and field height according to an embodiment of the present invention.

Please refer to FIG. 14, which is a block diagram of measuring LCA per given field height, fitting parametric model, and using the model and one stored correction to calculate any new correction for any lens position and field height according to an embodiment of the present invention.

For same lens position in order to reduce noise in the measurements. Without losing generality, multiple measurements can be performed from multiple camera modules.

At S1, LCA amount of one lens position is characterized (i.e., measured).

At S2, LCA amount of another one lens position is characterized (i.e., measured), to achieve parameter model fitting.

At S3, parameters of the model are stored to a memory. The feasible model is fit to data. In the specific case of dependency on lens position, it is known to be linear, so a linear model is selected.

At S4a, measurement for the particular camera module gives one data point in the graph.

At S4b, This graph illustrates, how the model and single characterization point are combined. The solid line was originally fit model. And the X is the actual characterization (LCA for single known lens position).

At S5, Y represents the LCA for run-time lens position, which is different from the characterized lens position. The model is used to calculate the LCA for that lens position.

Final correction utilizes Y to produce corrected result.

Figure 15:
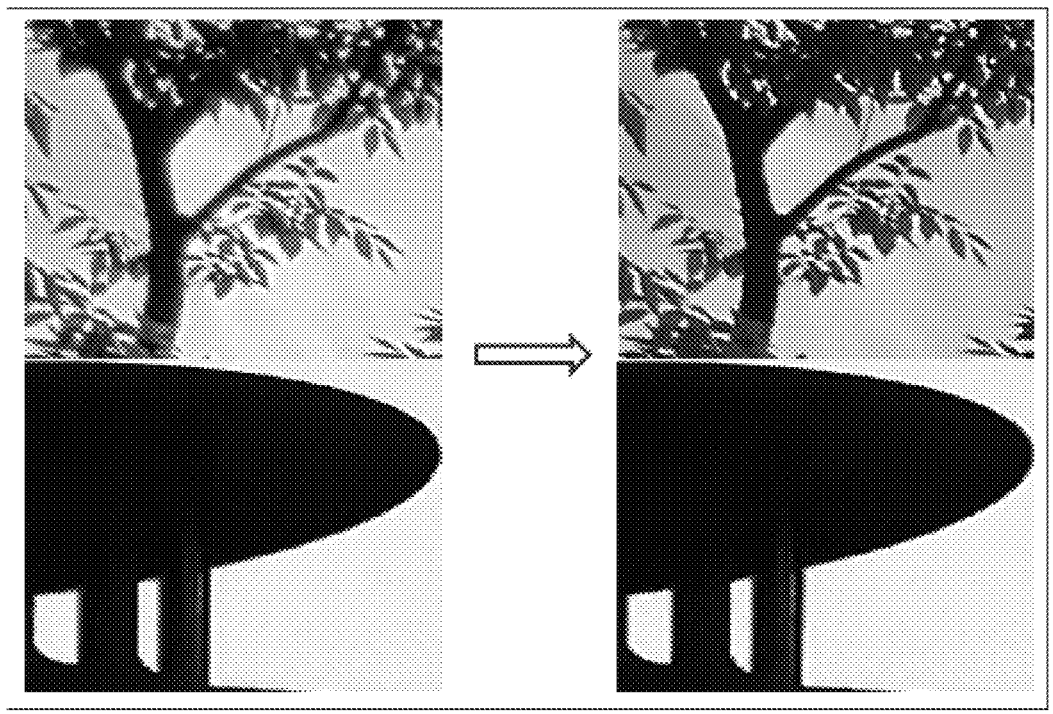
FIG. 15 is a comparison diagram of pictures before correcting LCA and after correcting LCA according to an embodiment of the present invention.

As an alternative, the calibration data is used to correct the LCA by an interpolation algorithm. For example, the calibration data in 2D calibrated grid is interpolated to sensor size and applied to the whole image. The Interpolation algorithm include linear interpolation, nearest neighbor interpolation, and bicubic interpolation. In the present invention, the better the interpolation algorithm for the given problem domain, the better the quality of the target image obtained after the LCA is corrected may be achieved. Even simple bicubic interpolation gives visually pleasant results, as shown in FIG. 15.

For example, if the R channel in the target image is moved to the left by 0.4 pixels relative to the G channel, the R channel in the target image is moved to the right by 0.4 pixels by the interpolation algorithm.

In an embodiment of the present invention, only red and blue pixels values are altered, which means only half of sensor data is changed. As compared with doing the same restoration in RGB domain, the embodiment of the present invention has a significantly improved computing efficiency and a significantly better image recovery quality.

It should be noted that, in practice, in addition to correcting the LCA, the image is usually processed by demosaicing and denoising, so as to guarantee the quality of the image. Since the interpolation algorithm is used to correct the LCA in the embodiment of the present invention, correcting the LCA before denoising may cause the reduction of the resolution and sharpness of a single color channel, and may also cause the reduction of the noise performance of the image. Therefore, correcting the LCA shall be performed after denoising and demosaicing.

In the technical solution of a method for correcting LCA according to the present invention, a target image is captured from a test chart-diagram; magnitude of LCA of a camera module is calculated based on the target image; a relationship model between lens position and magnitude of LCA is constructed based on preset parameters of the lens positions, and is stored as calibration data; system parameters of a camera to be corrected and the pre-stored calibration data are obtained; the LCA of the camera to be corrected is obtained by calculating the system parameters; and the LCA is corrected by the calibration data. In the present invention, the LCA of the camera lens can be corrected in terms of hardware with less costs.

Figure 16:
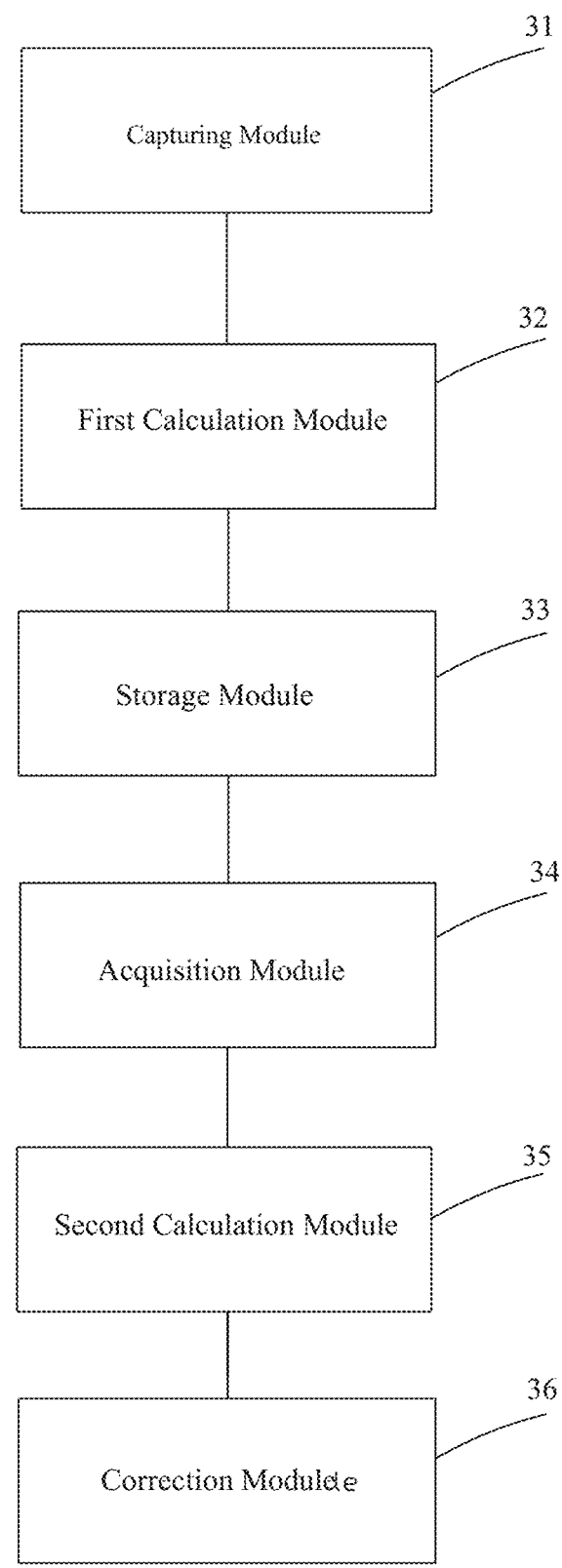
FIG. 16 is a schematic structural diagram of a device for correcting LCA according to an embodiment of the present invention.

FIG. 16 is a schematic structural diagram of a device for correcting LCA correction according to an embodiment of the present invention. As shown in FIG. 16, the device includes a capturing module 31, a first calculation module 32, a storage module 33, an acquisition module 34, a second calculation module 35, and a correction module 36.

The capturing module 31 is configured to capture a target image from a test chart-diagram.

For example, as shown in FIG. 4, the test chart-diagram may include a chart-diagram with dots. The present invention does not limit the form of the test chart-diagram, and the test chart-diagram may also be a chart-diagram of with crosses, dots, or checkerboards, etc.

The first calculation module 32 is configured to calculate magnitude of LCA of a camera module to be corrected based on the target image.

In the present invention, the first calculation module 32 includes an amplifying sub-module, a calculation sub-module, a compensation sub-module, a removal sub-module, an extrapolation sub-module, a conversion sub-module, and a relationship model sub-module.

The amplifying sub-module is configured to amplify the target image to obtain an amplified target image.

The calculation sub-module is configured to detect target graphics and calculate mass centers of the target graphics based on the amplified target image.

The compensation sub-module is configured to compensate shift of the mass centers by Bayer shift compensation.

The removal sub-module is configured to remove the target graphics with wrong parameters by an outlier removal algorithm.

The extrapolation sub-module is configured to extrapolate the mass centers of the target graphics at borders of the amplified target image.

The conversion sub-module 3 is configured to obtain magnitude of LCA by converting scattered data to a 2D regular grid.

The relationship model sub-module is configured to construct a relationship model between lens position and magnitude of LCA.

The storage module 33 is configured to store the relationship model between lens position and magnitude of LCA as calibration data.

In the present invention, the storage module 33 is configured to store the relationship model between lens position and magnitude of LCA as calibration data into a memory of the camera to be corrected.

In the present invention, it is not necessary to add any hardware structure to the camera to be calibrated, and only the original storage inside the camera to be calibrated is used.

In the present invention, the calibration data includes data in the format of a grid, a parametric model, or a symmetric model. Therefore, the method for correcting LCA according to the present invention supports calibration data in different formats, achieving increased usage flexibility. The calibration data in grid form is most accurate, but occupies most memory. If memory consumption have to be decreased, the memory may be compressed by changing format, size of the grid/model, data precision of the calibration data, etc.

In the present invention, the LCA of the camera lens to be calibrated may be calibrated in advance to obtain the calibration data, then the calibration data are stored in the memory of the camera to be correct. This method is fast and simple for mass production line, thus each camera to be calibrated may be calibrated individually.

The acquisition module 34 is configured to acquire system parameters and pre-stored calibration data.

The second calculation module 35 is configured to obtain the LCA of the camera to be corrected by calculating the system parameters.

The correction module 36 is configured to correct the LCA by the calibration data.

In the present invention, the interpolation algorithm includes a bicubic interpolation algorithm.

For example, if the R channel of the target image is moved to the left by 0.4 pixels relative to the G channel, the R channel of the target image will be moved to the right by 0.4 pixels by the interpolation algorithm.

In the present invention, the better the interpolation algorithm, the better the quality of the target image obtained after the LCA correction may be achieved. Optionally, the interpolation algorithm includes a bicubic interpolation algorithm.

It should be noted that, in practice, in addition to the LCA correction, the image is usually processed by demosaicing and denoising, so as to guarantee the quality of the image. Since the interpolation algorithm is used to correct the LCA in the embodiment of the present invention, correcting the LCA for the image before denoising may reduce the resolution and sharpness of a single color channel, and will cause the reduction of the noise performance of the image. Therefore, correcting the LCA shall be performed after denoising and demosaicing.

Figure 3:
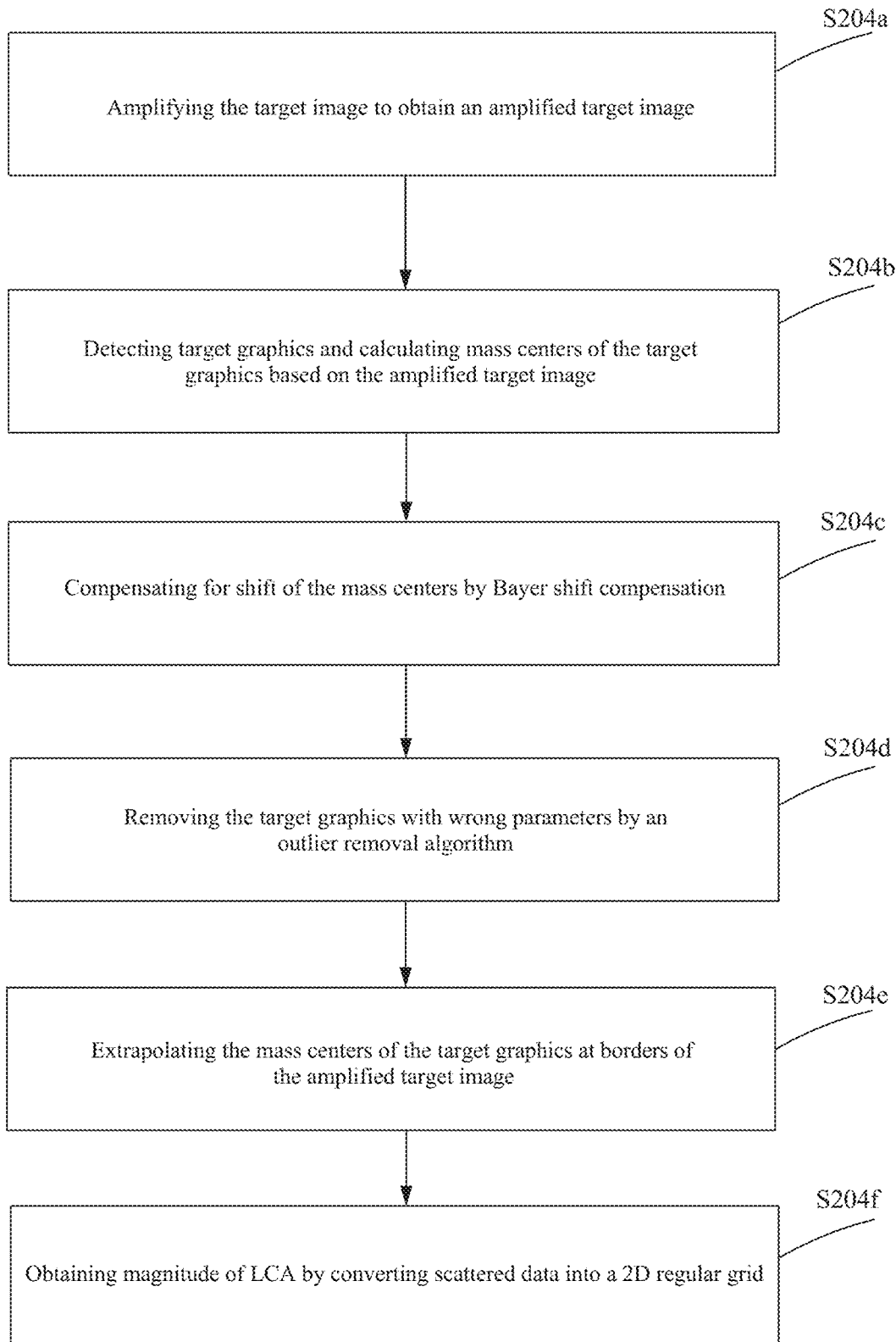
FIG. 3 is a specific flow chart of calculating magnitude of LCA of a camera module based on a target image as shown in FIG. 2.

The device for correcting the LCA according to the present invention may be used to implement the method for correcting the LCA as shown in FIGS. 1-3, the detailed description can be referred to the embodiments of the method for correcting LCA correction as described above and will not be repeated herein.

In a technical solution of a device for LCA correction according to the present invention, a target image is captured from a test chart-diagram; magnitude of LCA of a camera module is calculated based on the target image; a relationship model between lens position and magnitude of LCA based on preset parameters of lens positions is constructed, and stored as calibration data; system parameters of a camera to be corrected and pre-stored calibration data are obtained; the LCA of the camera to be corrected is obtained by calculating the system parameters; and the LCA is corrected by the calibration data. In the present invention, the LCA of the camera lens can be corrected in terms of hardware, and costs are saved.

Figure 17:
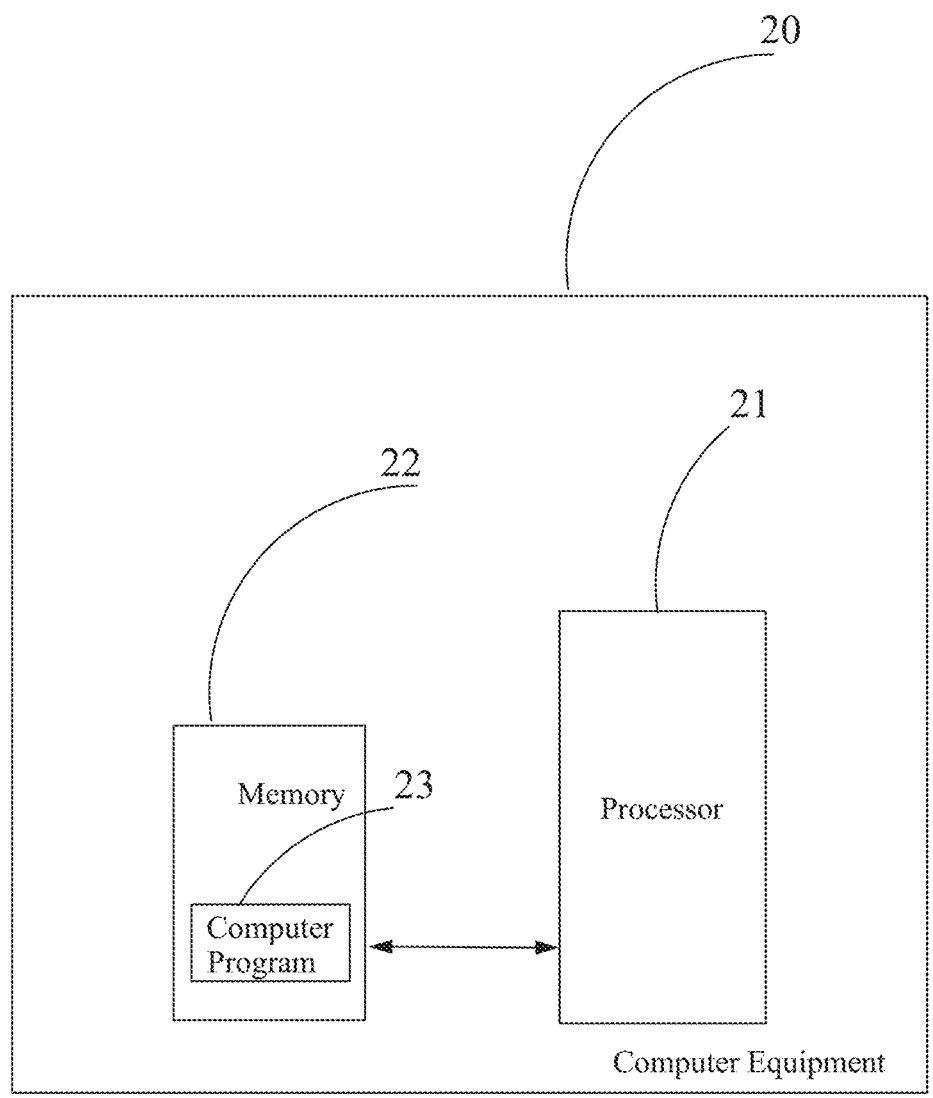
FIG. 17 is a schematic diagram of a computer equipment according to an embodiment of the present invention.

FIG. 17 is a schematic diagram of a computer equipment according to of an embodiment the present invention. As shown in FIG. 17, the computer equipment 20 includes a processor 21, a memory 22, and a computer program 23 stored in the memory 22 and running on the processor 21. When executed by the processor 21, the computer program 23 causes the method LCA for correcting the LCA as described above (which will not be described in detail again) to be implemented. Alternatively, when executed by the processor 21, the computer program causes each module/unit in the device for LCA correction as described above to perform the function, which will not be repeated herein.

The computer equipment 20 includes, but is not limited to, a processor 21 and a memory 22. Those skilled in the art can understand that FIG. 17 is merely an example of the computer equipment 20, but does not constitute a limitation to the computer equipment 20. Ore or less components than those as shown may be included, or a combination of certain components, or different components. For example, the computer deice may further include input and output devices, a network access device, a bus, etc.

The processor 21 may be a CPU or other general-purpose processor, Digital Signal Processor (DSP), Application Specific Integrated Circuits (ASIC), Field Programmable Gate Arrays (FPGA), or other programmable logic device, discrete gate or transistor logic device, discrete hardware components, etc. The general-purpose processor may be a microprocessor, or the processor may also be any conventional processor.

The memory 22 may be an internal storage unit of the computer equipment 20, such as a hard disk or a memory of the computer equipment 20. The memory 22 may also be an external storage device of the computer equipment 20, such as a plug-in hard disk equipped on the computer equipment 20, a Smart Storage Card (SMC), a Secure Digital (SD) card, or a Flash Card, etc. Further, the memory 22 may also include both an internal storage unit of the computer equipment 20 and an external storage device. The memory 22 is configured to store a computer program and other programs and data required by the computer equipment. The memory 22 may also be configured to temporarily store data that has been output or will be output.

Those skilled in the art can clearly understand that the operation process of the device and units as described above may correspond to the process in the methods as described above, which will not be repeated here.

In the several embodiments of the present invention, it should be understood that the disclosed device and method may be implemented in other manners. For example, the devices as described above are merely illustrative, and for example, the division of the units is only a division in the logical function, and there may be other division manners in actual implementations. For example, multiple units or components may be combined or it integrated into another system, or some features may be omitted or not implemented. In addition, the displayed or discussed mutual coupling or direct coupling or communication connection may be indirect coupling or communication connection via some interfaces, devices or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions according to the present invention.

In addition, the functional units in the embodiments of the present invention may be integrated into one processing unit, or each unit may exist alone physically, or two or more units may be integrated into one unit. The above-mentioned integrated unit may be implemented in the form of a hardware functional unit, or may be implemented in the form of a functional unit based on a combination of hardware and software.

The above-mentioned integrated unit implemented in the form of a software functional unit may be stored in a computer readable storage medium. The above-mentioned software functional unit is stored in a storage medium and includes several instructions to cause a computer equipment (which may be a personal computer, a server, or a network device, etc.) or a processor to execute part of the steps in the method as described in each embodiment of the present invention. The aforementioned storage media include: a U disk, a mobile hard disk, a Read-Only Memory (ROM), a Random Access Memory (RAM), a magnetic disk, an optical disk or any medium able to store program codes.

The above description are only the preferred embodiments of the present invention and are not intended to limit the present invention. Any modification, equivalent replacement, improvement, etc. made within the spirit and principle of the present invention shall fall within the scope of the present invention.

What is claimed is:

1. A method for correcting lateral chromatic aberration, comprising:
    constructing a relationship model between lens position and magnitude of lateral chromatic aberration based on preset parameters of lens positions, and storing the relationship model as calibration data, comprising
    capturing a target image from a test chart-diagram;
    calculating magnitude of lateral chromatic aberration of a camera module based on the target image, comprising
        amplifying the target image to obtain an amplified target image;
        detecting target graphics and calculating mass centers of the target graphics based on the amplified target image;
        compensating for shift of the mass centers by sampling shift compensation;
        removing target graphics with wrong parameters by an outlier removal algorithm;
        extrapolating the mass centers of the target graphics at borders of the amplified target image; and
        converting scattered data into a 2D regular grid, so as to obtain magnitude of lateral chromatic aberration; and
    storing the relationship model between lens position and magnitude of lateral chromatic aberration as calibration data;
    acquiring system parameters of a camera to be corrected and pre-stored calibration data;
    obtaining the lateral chromatic aberration of the camera to be corrected by calculating the system parameters; and
    correcting the lateral chromatic aberration by the calibration data.

2. The method for correcting lateral chromatic aberration as described in claim 1, wherein said storing the relationship model between lens position and magnitude of lateral chromatic aberration as calibration data comprises: storing the relationship model between lens position and magnitude of lateral chromatic aberration as calibration data into a memory of the camera to be corrected.

3. The method for correcting lateral chromatic aberration as described in claim 1, wherein the calibration data comprises data in a format of a grid, a parametric model, or a symmetric model.

4. A device for correcting lateral chromatic aberration using the method as described in claim 1, comprising:
    a capturing module configured to capture a target image from a test chart-diagram;
    a first calculation module configured to calculate magnitude of lateral chromatic aberration of a camera module based on the target image, and to construct a relationship model between lens position and magnitude of lateral chromatic aberration based on preset parameters of lens positions; and
    a storage module configured to store the relationship model between lens position and magnitude of lateral chromatic aberration as the calibration data.

5. The device for correcting lateral chromatic aberration as described in claim 4, wherein the storage module is further configured to store the relationship model between lens position and magnitude of lateral chromatic aberration into a memory of the camera to be corrected.

6. The device for correcting lateral chromatic aberration as described in claim 4, wherein the calibration data comprises data in a format of a grid, a parametric model, or a symmetric model.

7. The device for correcting lateral chromatic aberration as described in claim 4, wherein the first calculation module comprises:
    an amplifying sub-module configured to amplify the target image to obtain an amplified target image;

a calculation sub-module configured to detect target graphics and calculate mass centers of the target graphics based on the amplified target image;
a compensation sub-module configured to compensate for shift of the mass centers by sampling shift compensation;
a removal sub-module configured to remove the target graphics with wrong parameters by an outlier removal algorithm;
an extrapolation sub-module configured to extrapolate the mass centers of the target graphics at borders of the amplified target image;
a conversion sub-module configured to convert scattered data into a 2D regular grid, so as to obtain magnitude of lateral chromatic aberration; and
a relationship model sub-module configured to construct the relationship model between lens position and magnitude of lateral chromatic aberration.

8. The device for correcting lateral chromatic aberration as described in claim 4, further comprising:
   an acquisition module configured to acquire system parameters of a camera to be corrected and pre-stored calibration data;
   a second calculation module configured to obtain the lateral chromatic aberration of the camera to be corrected by the system parameters; and
   a correction module configured to correct the lateral chromatic aberration by the calibration data.

9. A computer equipment, comprising a memory configured to store information comprising program instructions, and a processor configured to control execution of the program instructions, wherein the program instructions, when loaded and executed by the processor, perform the steps in the method for correcting lateral chromatic aberration as described in claim 1.

* * * * *